United States Patent [19]

Stenzenberger

[11] 3,966,864
[45] June 29, 1976

[54] FILAMENT-WOUND REINFORCED PLASTIC ARTICLES AND PROCESS OF MAKING AND USING SAME

[75] Inventor: Horst Stenzenberger, Dossenheim, Germany

[73] Assignee: Technochemie GmbH Verfahrenstechnik of Heidelberg, Heidelberg, Germany

[22] Filed: Apr. 8, 1975

[21] Appl. No.: 566,530

Related U.S. Application Data

[63] Continuation of Ser. No. 334,472, Feb. 21, 1973, abandoned.

[52] U.S. Cl. .............................. 264/137; 156/175; 264/136; 264/229
[51] Int. Cl.$^2$ ........................................ B29C 27/26
[58] Field of Search .................. 264/136, 137, 229; 156/173, 175

[56] References Cited
UNITED STATES PATENTS

| 3,530,212 | 9/1970 | Kienle | 264/137 |
|---|---|---|---|
| 3,627,780 | 12/1971 | Bonnard | 260/326.3 |
| 3,629,028 | 12/1971 | McLarty | 156/175 |
| 3,654,227 | 4/1972 | Dine-Hart | 260/37 N |
| 3,743,561 | 7/1973 | Koontz | 264/137 X |

FOREIGN PATENTS OR APPLICATIONS

| 238,021 | 1959 | Australia | 156/173 |

Primary Examiner—Richard R. Kucia
Attorney, Agent, or Firm—Erich M. H. Radde

[57] ABSTRACT

Filament-wound reinforced plastic articles and parts thereof are obtained by wetting and impregnating filaments, rovings, webs, and the like fibrous materials consisting of glass, carbon, graphite, boron, steel, asbestos, temperature resistant organic fibers, and the like with a liquid or liquefied polymerizable organic compound of a high melting point which can be polymerized by addition polymerization, and converting the wetted fibrous material into the desired wound plastic article or part thereof by winding around a mandrel and then subjecting the wound article to addition polymerization. Wetting and winding with the polymerizable organic compound are effected under conditions under which substantially no polymerization takes place. Especially suitable polymerizable organic compounds are bisimides such as the bismaleimides of a melting point which is at least 20° C. below the temperature required for polymerization.

7 Claims, No Drawings

FILAMENT-WOUND REINFORCED PLASTIC ARTICLES AND PROCESS OF MAKING AND USING SAME

This is a continuation of application Ser. No. 334,472, filed Feb. 21, 1973 now abandoned.

BACKGROUND OF THE INVENTION

1. Field of the Invention

The present invention relates to filament-wound reinforced plastic articles and more particularly to such filament-wound reinforced plastic articles, the filaments of which are coated with and embedded in an organic polymer obtained by addition polymerization, to a porcess of making such filament-wound reinforced plastic articles, and to using the same.

2. Description of the prior Art

It is known to produce reinforced plastic parts or articles of high strength and relatively light weight by the so-called filament-winding process. This process consists in winding continuous fibers or filaments encased or embedded in a matrix of a suitable resinous material into a definite pattern. The resin-encased filament is wound continuously on a form or mandrel of a shape which corresponds to the inner structure of the plastic part or article to be manufactured. After curing the resin, the form either can be discarded or it forms an integral part of the resulting structure.

It is also known to use, for instance, epoxy resins or polyester resins on account of their low viscosity at room temperature, to coat and impregnate fibers and filaments, such as glass, graphite, carbon, boron, steel, asbestos, and the like fibers and filaments, to convert such coated and impregnated fibers or filaments to filament-wound articles, and to harden and cure the resulting wound article thermally so as to produce the desired filament-wound reinforced plastic article. The resulting wound reinforced plastics have properties which depend upon the properties of the fibers or filaments used as well as upon the properties of the reinforcing plastic.

It is also known to dissolve prepolymerization products or monomeric polymerizable compounds which are solid at room temperature, in suitable solvents, to impregnate the fibers or filaments therewith, and to convert the resulting impregnated fibers or filaments into wound articles. Thereby the solvent is removed during the filament winding process and/or during the hardening and curing process. The resulting wound articles, however, have a high pore volume due to the removal of the solvent during or after winding.

SUMMARY OF THE INVENTION

It is one object of the present invention to provide a novel and valuable filament-wound reinforced plastic part or article of improved properties and especially a substantially pore-free article with high strength properties, stiffness, and stability of shape, of a low thermal coefficient of expansion, of superior mechanical and chemical resistance, and of excellent electrical properties.

Another object of the present invention is to provide a simple and effective process of producing such a valuable filament-wound reinforced plastic part or article.

Still another object of the present invention is to use such a valuable filament-wound reinforced plastic part or article for many purposes.

Other objects of the present invention and advantageous features thereof will become apparent as the description proceeds.

In principle the process of producing the novel and valuable filament-wound reinforced plastic parts or articles according to the present invention consists in the following steps:

a. The fibers or filaments of glass, carbon, boron, temperature resistant organic fibers, or other fiber materials are coated and/or impregnated under conditions at which no substantial polymerization takes place with a liquid or liquefied polymerizable organic compound, of a high melting point which is capable of being polymerized by addition polymerization.

b. The thus coated and/or impregnated fibers or filaments are then subjected to the filament winding process on a suitable form or mandrel to produce the desired filament-wound plastic part or article.

c. The resulting plastic article is finally subjected to addition polymerization to cause hardening and curing of the polymer.

The process according to the present invention thus differs essentially from the known processes by the elimination of the solvent for the resin, and, as stated above, by using a polymerizable monomer of specific properties, namely having a high melting point or melting range, being liquid at the winding temperatures, and being polymerized when subjected to addition polymerization.

Although any polymerizable organic compound which is liquid or can be liquefied at the winding temperature can be used for the process of the present invention, the preferred monomers to be used in the process of this invention are the bisimides of the following Formula I:

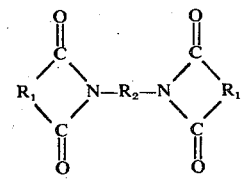

In said formula.

$R_1$ indicates a group which is capable of addition polymerization, for instance, alkenyl and cycloalkenyl, while $R_2$ is alkylene, cycloalkylene, arylene, or at least two cycloalkylenes or arylenes bonded to one another through at least one of the following groups: The methylene group —$CH_2$—, the sulfone group —$SO_2$—, or the oxo group —O—. The substituents designated by $R_2$ may be substituted.

Such bisimides are obtained, for instance, by reacting two moles of reactive unsaturated dicarboxylic acid derivative and preferably a dicarboxylic acid anhydride of Formula II with one mole of a diamine of Formula III

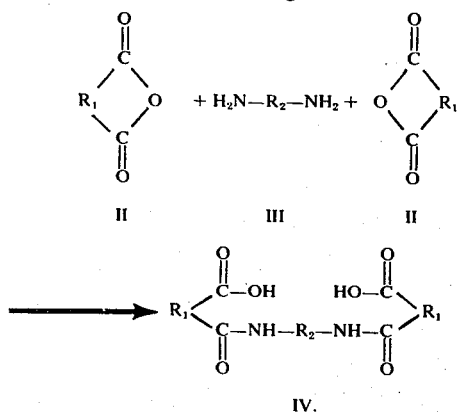

The resulting imidocarboxylic acid of Formula IV is then subjected to ring closure to yield the bisimide of Formula I whereby water is split off.

Preferred bisimides of Formula I are the maleic acid N,N'-bisimides such as N,N'-ethylene bis-maleimide, N,N'-hexamethylene bis-maleimide, N,N'-m-phenylene bis-maleimide, N,N'-p-phenylene bis-maleimide, N,N'-p,p'-diphenylmethane bis-maleimide, N,N'-diphenylsulfone bis-maleimide, N,N'-p,p'-diphenyl ether bis-maleimide, N,N'-dicyclohexyl methane bis-maleimide, N,N'-α,α'-p-dimethylene cyclohexane bis-maleimide, N,N'-m-xylylene bis-maleimide, 2,4-toluylene bis-maleimide, 2,2,4-trimethyl hexamethylene bis-maleimide, and the like bisimides, and/or mixtures thereof. The corresponding N,N'-bisimides obtained by reacting itaconic acid anhydride, citraconic acid anhydride, tetrahydrophthalic acid anhydride, 3,6-endomethylene-1,2,3,6-tetrahydrophthalic acid anhydride and the like acid anhydrides can also be used for producing suitable polyimides.

In general, bisimides of Formula I which are especially useful in the process of the present invention have a melting point below 200° C. Bisimides of a melting point of about 200° C. or higher are usually not suitable because their polymerization proceeds at or above 200° C. so rapidly that the fibers cannot be wetted sufficiently and satisfactorily. The bisimides of Formula I which can be used in the process of this invention have the property that they polymerize on heating above their melting point. The speed of addition polymerization is a function of the temperature. Thereby, progressing polyaddition results in an increase of the viscosity of the bisimide melt. The higher the temperature, the more rapid is the speed of polyaddition and, as a result thereof, the viscosity increase of the melt.

Optimum wetting of the fibers or filaments requires a viscosity of the melt lower than 800 centistokes. It follows that polymerization adversely affecting the winding operation takes place if the viscosity of the molten bisimide increases too rapidly, so that wetting of the fibers or filaments becomes impossible. For instance, polymerization adversely affecting the winding operation takes place if the viscosity increases above 800 centistokes because such a viscosity prevents satisfactory wetting of the fibers or filaments. Thus by determining the increase in viscosity of a bisimide melt it is readily possible to determine whether a bisimide is suitable for the process of this invention. Melts of bisimides exhibiting a rapid increase in viscosity on heating above their melting point, i.e. bisimides with a high speed of polymerization cannot be used in the process of this invention.

Suitable bisimides of Formula I are compounds which are crystalline at room temperature and which, depending upon the composition of the substituents $R_1$ and $R_2$, possess relatively well defined melting points. Polyaddition takes place when heating such bisimides to a temperature between about 150° C. and about 270° C. All those bisimides the melting temperature of which is below 200° C. and at least 20° C. below the temperature at which substantial polymerization sets in, are especially useful for the purpose of the present invention.

For instance, 1,12-bismaleimido dodecane of Formula V

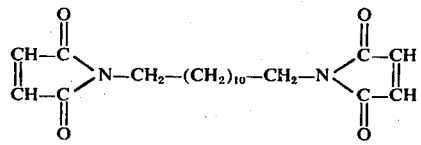

which has a melting point of 110°–112° C., has proved to be especially suitable for the hot-winding process of this invention. It is melted in the impregnating vessel, the temperature of the melt is adjusted to 120° C., and the endless filament is drawn through the bath in order to homogeneously wet the same. The wetted filament is then converted into the desired wound article by winding it around a mandrel heated to 120° C. The wound article is finally polymerized by addition polymerization by heating the mandrel with the winding to a temperature of 220°–240° C.

It is frequently advisable to use mixtures of various bisimides, especially if the melting temperature of the mixture is so much lower than its polymerization temperature that polymerization which may disadvantageously affect the wetting and winding operations does not take place until winding is completed.

Thus a mixture of 50 %, by weight, of 1,12-bismaleimido dodecane of the melting point 110°–112° C. and 50 %, by weight, of 2,4-bismaleimido toluene of the melting point of 172°–176° C. yields a clear melt at a temperature of 150° C. which is especially suitable for wetting the endless filaments. Said mixture has a viscosity of 17.39 – 17.66 centistokes at 150° C. Such a viscosity insures faultless coating of the fibers with the molten bisimide mixture. The coated filaments are subsequently converted into the wound article by winding them upon a mandrel heated to 150° C. The wound article is subjected to addition polymerization by heating to 240°–250° C. It is essential for the wetting and winding operations taking place satisfactorily, that the polymerization proceeds at 150° C. at such a low speed that conversion of the wetted filaments into the wound article is effected without any trouble.

The new process is useful, for instance, in the manufacture of plastic tubes, containers, and other molded articles of plastics reinforced with endless filaments, whereby the plastic material has a high temperature stability and can be used at temperatures above 200° C. The resulting wound articles do not have a demonstrable pore volume.

As stated hereinabove, fibers of glass, carbon, graphite, boron, temperature resistant organic fibers, and the like can be used in the process of this invention.

DESCRIPTION OF THE PREFERRED EMBODIMENTS

The following examples serve to illustrate the present invention without, however, being limited thereto.

EXAMPLE 1

100 Parts of 1,12-bismaleimido dodecane are molten in a container heated to 120° C. The viscosity of the resulting melt is 13.60 centistokes. An endless carbon filament is drawn through the melt in such a manner that it is completely coated with a thin film of the molten 1,12-bismaleimido dodecane. The coated filament is wound around a mandrel preheated to 120° C. The distance between the impregnating bath and the winding mandrel is kept as short as possible so that no crystallization of the bisimide can take place between the impregnating bath and the winding mandrel. The winding mandrel, the impregnating bath, and the bobbin with the endless carbon filament are arranged so that continuous wetting, impregnation, and winding can be carried out. A wound article is obtained thereby which consists of several fiber layers wound one above the other. Said filament-wound plastic article is then subjected to addtition polymerization, while still being on the mandrel, by heating to 240° C. for 1 hour. After curing, the wound article is removed from the mandrel. It is distinguished by its high stiffness and non-deformability at a temperature up to 200° C. and by being free of pores.

EXAMPLE 2

A mixture of 50 parts, by weight, of 1,12-bis-maleimido dodecane and 50 parts, by weight, of 2,4-bis-maleimido toluene is converted in the same manner as described in Example 1 into a wound plastic article. The viscosity of the molten mixture used for wetting an impregnating the carbon filaments is 17.5 centistokes at 150° C. The temperature of the wetting and impregnating bath and of the winding mandrel is adjusted to 150° C. Hardening and curing of the wound article is effected by heating to 250° C. for 1 hour.

EXAMPLE 3

A mixture of 50 parts, by weight, of 2,4-bis-maleimido toluene and 50 parts, by weight, of 1,6-bis-maleimido-(2,2,4-trimethyl) hexane yields a clear melt of low viscosity at a temperature of 145° C. Endless glass fibers are coated therewith and wound articles are produced therefrom by proceeding as described in Example 1.

EXAMPLE 4

By using the melt according to Example 3, a carbon filament is converted into the wound plastic article. Addition polymerization is effected at 230° C. The wound article can be used at temperatures up to 200° C. In order to achieve especially high mechanical strength properties, it is advisable to subject the wound article to a subsequent hardening and curing treatment at 230° C. for 24 hours.

EXAMPLE 5

A mixture of 56 parts, by weight, of 4,4'-bis-maleimido diphenylmethane, 24 parts, by weight, of 2,4-bismaleimido toluene, and 20 parts, by weight, of 2,2,4-(trimethyl) hexamethylene bismaleimide is heated at 125° C. while stirring until a clear homogeneous melt is obtained. Said melt which has an initial viscosity of 110–115 centistokes at 125° C. is poured into an electrically heated wetting and impregnating bath which is heated at a constant temperature of 125° C. A carbon fiber roving of 5,000 single filaments of the Modmor II Type (Marganite Modmor Ltd. of London, Great Britain) is passed through said wetting bath. A rotating polygon is used as winding mandrel. It enables the production of unidirectionally reinforced plates or sheets. The polygon is provided with a circulating oil heating system in order to heat the mandrel to a constant temperature of 150° C. The carbon fiber roving is drawn through the impregnating and wetting bath for coating with the liquefied mixture and is then wound on the polygon in such a manner that the filaments are placed one adjacent the other. In this manner plates or sheets which are reinforced in one direction by carbon filaments, are formed. The winding tension with which the filament is pulled from the bobbin is adjusted in such a manner that it amounts constantly to 250 g. Thereby, so many filaments are placed around the mandrel that the thickness of the resulting plates amounts to 3 mm.

After the wetted and impregnated filaments are positioned on the mandrel, the wound plates are hardened and cured on the polygon by heating to 205°–210° C. for about 7 hours. After cooling, the cured plates are removed from the polygon.

Test bars are cut from the plates in order to determine their mechanical strength properties. The following Table shows the flexural strength and the flexural modulus determined with plates of a carbon fiber content of 40 %, by volume.

Table

Flexural strength and flexural modulus of a polyimide plate which has been unidirectionally reinforced.

| | |
|---|---|
| Fiber content | 40 %, by volume. |
| Testing temperatures: | 20°C., 150°C., 200°C., 250°C. |
| Length of the test bar: | 100 mm. |
| Width of the test bar: | 10 mm. |
| Thickness of the test bar: | 3 mm. |
| Span tested at a span to depth ratio of 30 : 1 : | 90 mm. |

| Temperature | Flexural strength kp/sq.mm. | Flexural modulus kp/sq.mm. | Interlaminar shear strength [+] kp/sq.mm. |
|---|---|---|---|
| 20° C. | 56.50 | 11,127 | 4.2 |
| 150° C. | 53.62 | 10,724 | 4.2 |
| 200° C. | 57.08 | 10,996 | 4.1 |
| 250° C. | 60.77 | 10,843 | 3.9 |

[+] Span to depth ratio = 5 : 1

EXAMPLE 6

A mixture of 56 parts, by weight, of 4,4'-bis-maleimido diphenylmethane, 24 parts, by weight, of 2,4-bismaleimido toluene, and 20 parts, by weight, of 2,2,4-(trimethyl) hexamethylene bismaleimido which has a starting viscosity of 110–115 centistokes at 125° C., is heated, while stirring, until the viscosity of the melt has increased to 400–420 centistokes. The resulting prepolymerized melt is used for producing unidirectional polyimide plates reinforced by carbon fibers. The manufacture of these plates is carried out in an analogous manner as described in Example 5. The mechanical strength properties of the resulting plates correspond to those of the plates of Example 5.

EXAMPLE 7

A mixture consisting of 56 parts, by weight, of 4,4'-bismaleimido diphenylmethane, 24 parts, by weight, of 2,4-bismaleimido toluene, and 20 parts, by weight, of 2,2,4-(trimethyl) hexamethylene bismaleimide with an initial viscosity of 110–115 centistokes, is used for coating a strip of glass fiber of a width of 200 mm. The web strip is then passed through the impregnating bath containing the above mentioned molten mixture of bisimides. After leaving the impregnating bath, the web is conducted through a heated pair of rollers to strip off therefrom excess bisimide. The wetted strip is then wound around a winding mandrel heated to 150° C. in such a manner that a tube of a wall thickness of 3 mm. is formed. The tube is removed from the mandrel after it has been cured thereon. Before winding, the mandrel is sprayed with a Teflon aerosol as mold release agent, so as to prevent the tube from sticking to the mandrel.

EXAMPLE 8

A mixture consisting of 55 parts, by weight, of 4,4'-bismaleimido diphenyl ether, 20 parts, by weight, of 4,4'-bismaleimido diphenylmethane, and 20 parts, by weight, of 2,4-bismaleimido toluene is heated to 145° C., while stirring, until a clear homogeneous melt is obtained. The initial viscosity of the melt is 85 centistokes at 40° C. The melt is heated in the impregnating bath to a constant temperature of 140° C. A twelve-ended roving of the PRD 49 fiber which is an organic high modulus fiber sold by E. I. Dupont de Nemours, is coated therewith by passing it through said melt. The resulting bisimide-coated endless filaments are used for producing a wound plastic article as described in Example 1. The temperature of the mandrel is 155° C. during winding. After curing at 240° C. for about 3 hours, a pore-free wound plastic article is obtained which is distinguished by its stiffness and its dimensional stability on heating to a temperature above 200° C.

It is, of course, also possible to provide the fiber material with the bisimide coating by spraying or by applicaton with a brush. However, the preferred procedure is to pass the fiber material through a wetting and impregnating bath which, at the same time, serves as storage container for the molten bisimide.

Impregnating or wetting can also be effected indirectly by passing the roving or filaments or the like over a roller impregnated with the molten bisimide.

As stated above, the advantages of the use of bisimide in the manufacture of filament-wound reinforced plastic articles are as follows:

No solvents are required.

No condensation products are formed on curing which may cause pore formation in the resulting article.

The viscosity of the melt during winding is low and the viscosity-time characteristics permit to properly carry out the winding process.

The low viscosity of the bisimides during processing enables the production of plastic parts and articles with a high fiber content.

The slight increase in viscosity of the bisimides during winding ensures uniform distribution of fiber and resin in the entire wound plastic article.

The flexural, strength remains in general constant up to a temperature of 250° C., likewise the flexural modulus. This means that no decrease in the strength properties takes place on heating.

Especially useful filament-wound reinforced plastic articles are obtained by using the PRD-49 fiber of the firm Dupont de Nemours as described in Example 8. Such fibers have twice the modulus of glass fibers and correspond in their strength properties to those of glass fibers although their weight is 45 % lower.

I claim:

1. In a process of producing a filament-wound reinforced substantially pore-free plastic article by wetting and impregnating fibrous material with a plastic material and winding the wetted and impregnated fibrous material around a mandrel of a shape corresponding to the inner structure of the desired plastic article, the improvement which consists in the steps of
    a. wetting and impregnating the filamentary fibrous material with a liquid molten polymerizable bisimide having a melting point below 200°C., which melting point is at least 20°C. below the temperature at which substantial polymerization sets in, said wetting and impregnating step being carried out at a temperature above the melting point of said bisimide and below that at which substantial polymerization takes place, at which temperature said bisimide has a viscosity substantially lower than 800 centistokes;
    b. winding the thus wetted and impregnated filamentary fibrous material around a winding mandrel of the desired shape to produce the respective wound article; and
    c. heating said wound article at a temperature sufficient to effect addition polymerization and to cause hardening and curing to the filament-wound, reinforced plastic article.

2. The process of claim 1, in which the polymerizable organic compound is a bisimide, the polymerization speed of which is substantially slower than the time required for winding the filamentary fibrous material wetted and impregnated with the polymerizable bisimide around the winding mandrel.

3. The process of claim 1, in which the polymerizable compound is a bisimide of the formula

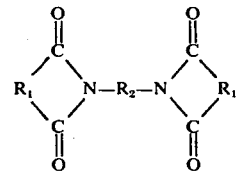

in which
R$_1$ indicates a group which is capable of addition polymerization, while
R$_2$ is a member selected from the group consisting of alkylene, cycloalkylene, arylene, at least two arylenes bonded to one another through a member selected from the group consisting of methylene —CH$_2$—, sulfone —SO$_2$—, and oxo —O—, at least two cycloalkylenes bonded to one another through a member selected from the group consisting of methylene —CH$_2$—, sulfone —SO$_2$—, and oxo —O—, and such substituted alkylene, cycloalkylene, and arylene.

4. The process of claim 3, in which the polymerizable compound is a bismaleimide.

5. The process of claim 4, in which the polymerizable compound is a bismaleimide selected from the group consisting of 1,12-bismaleimido dodecane, 2,4-bismaleimido toluene, 1,6-bismaleimido-2,2,4-(trimethyl) hexane, 4,4'-bismaleimido diphenylmethane, 4,4'-bismaleimido diphenyl ether, and mixtures thereof.

6. The process of claim 1, wherein said winding of the wetted and impregnated filamentary fibrous material around the mandrel is carried out at a temperature at which substantially no polymerization of said bisimide takes place.

7. The process of claim 1, wherein said winding of the wetted and impregnated filamentary fibrous material around the mandrel is carried out at a tension of said filamentary fibrous material of about 250 g.

* * * * *